(12) United States Patent
Song et al.

(10) Patent No.: US 10,091,495 B2
(45) Date of Patent: Oct. 2, 2018

(54) APPARATUS AND METHOD FOR DISPLAYING STEREOSCOPIC IMAGES

(71) Applicants: Jianping Song, Beijing (CN); Lin Du, Beijing (CN); Yan Xu, Beijing (CN)

(72) Inventors: Jianping Song, Beijing (CN); Lin Du, Beijing (CN); Yan Xu, Beijing (CN)

(73) Assignee: THOMSON LICENSING, Issy-les-Moulineaux (FR)

( * ) Notice: Subject to any disclaimer, the term of this patent is extended or adjusted under 35 U.S.C. 154(b) by 263 days.

(21) Appl. No.: 14/654,804

(22) PCT Filed: Dec. 24, 2012

(86) PCT No.: PCT/CN2012/087346
§ 371 (c)(1),
(2) Date: Jun. 22, 2015

(87) PCT Pub. No.: WO2014/100959
PCT Pub. Date: Jul. 3, 2014

(65) Prior Publication Data
US 2015/0341622 A1 Nov. 26, 2015

(51) Int. Cl.
*H04N 21/43* (2011.01)
*H04N 13/30* (2018.01)
*H04N 13/04* (2006.01)
*H04N 5/45* (2011.01)
*H04N 21/431* (2011.01)
(Continued)

(52) U.S. Cl.
CPC ............ *H04N 13/30* (2018.05); *H04N 5/45* (2013.01); *H04N 13/004* (2013.01); *H04N 13/0018* (2013.01); *H04N 13/0022* (2013.01); *H04N 13/04* (2013.01); *H04N 21/431* (2013.01); *H04N 21/816* (2013.01); *H04N 21/4316* (2013.01); *H04N 2013/0081* (2013.01)

(58) Field of Classification Search
CPC .. H04N 13/0022; H04N 13/004; H04N 13/04; H04N 5/45; H04N 13/0018; H04N 21/431; H04N 21/816
See application file for complete search history.

(56) References Cited

U.S. PATENT DOCUMENTS

2009/0141024 A1 6/2009 Lee et al.
2010/0074594 A1 3/2010 Nakamura et al.
(Continued)

FOREIGN PATENT DOCUMENTS

CN 101742172 6/2010
CN 102598677 7/2012
(Continued)

OTHER PUBLICATIONS

Search Report dated Sep. 12, 2013.

*Primary Examiner* — Neil Mikeska
(74) *Attorney, Agent, or Firm* — Tutunjian & Bitetto, P.C.

(57) ABSTRACT

One aspect of the disclosed invention relates to a stereoscopic display apparatus comprising: a stereo image acquisition unit configured to acquire a first stereo image for a first image and a second stereo image for a second image; a border generation unit configured to generate a border for separating the first image from the second image; and a displaying unit configured to combine the second stereo image and the generated border with the first stereo image and display the combined stereo images.

15 Claims, 15 Drawing Sheets

(51) Int. Cl.
*H04N 21/81* (2011.01)
*H04N 13/00* (2018.01)

(56) References Cited

U.S. PATENT DOCUMENTS

| | | | | |
|---|---|---|---|---|
| 2011/0115880 A1* | 5/2011 | Yoo | ................... | H04N 13/0022 |
| | | | | 348/42 |
| 2011/0119708 A1 | 5/2011 | Lee et al. | | |
| 2011/0304691 A1* | 12/2011 | Newton | ............. | H04N 13/0018 |
| | | | | 348/43 |
| 2012/0081515 A1* | 4/2012 | Jang | ........................ | H04N 5/45 |
| | | | | 348/43 |
| 2012/0092450 A1* | 4/2012 | Choi | ................... | H04N 13/004 |
| | | | | 348/43 |
| 2012/0167136 A1* | 6/2012 | Yuen | .................. | H04N 5/44543 |
| | | | | 725/36 |
| 2012/0224035 A1* | 9/2012 | Noguchi | ............. | H04N 13/007 |
| | | | | 348/54 |

FOREIGN PATENT DOCUMENTS

| | | |
|---|---|---|
| EP | 2442561 | 4/2012 |
| WO | 2010032399 A1 | 3/2010 |
| WO | WO2010070567 | 6/2010 |
| WO | WO2010143820 | 12/2010 |
| WO | WO2011030234 | 3/2011 |
| WO | WO2011059260 | 5/2011 |
| WO | 2011131230 A1 | 10/2011 |
| WO | 2012054251 A2 | 4/2012 |
| WO | WO2012055892 | 5/2012 |
| WO | 2012169336 A1 | 12/2012 |

* cited by examiner

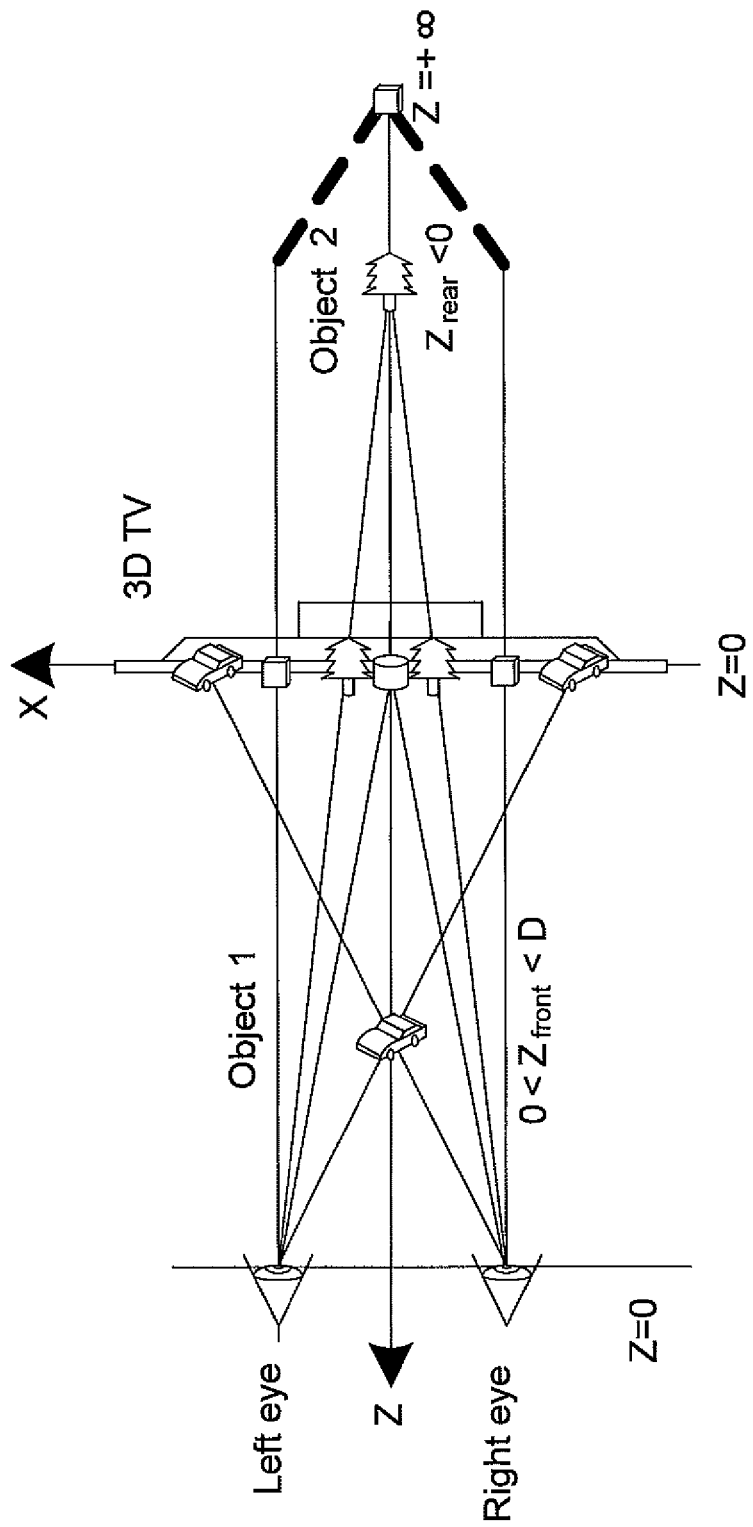

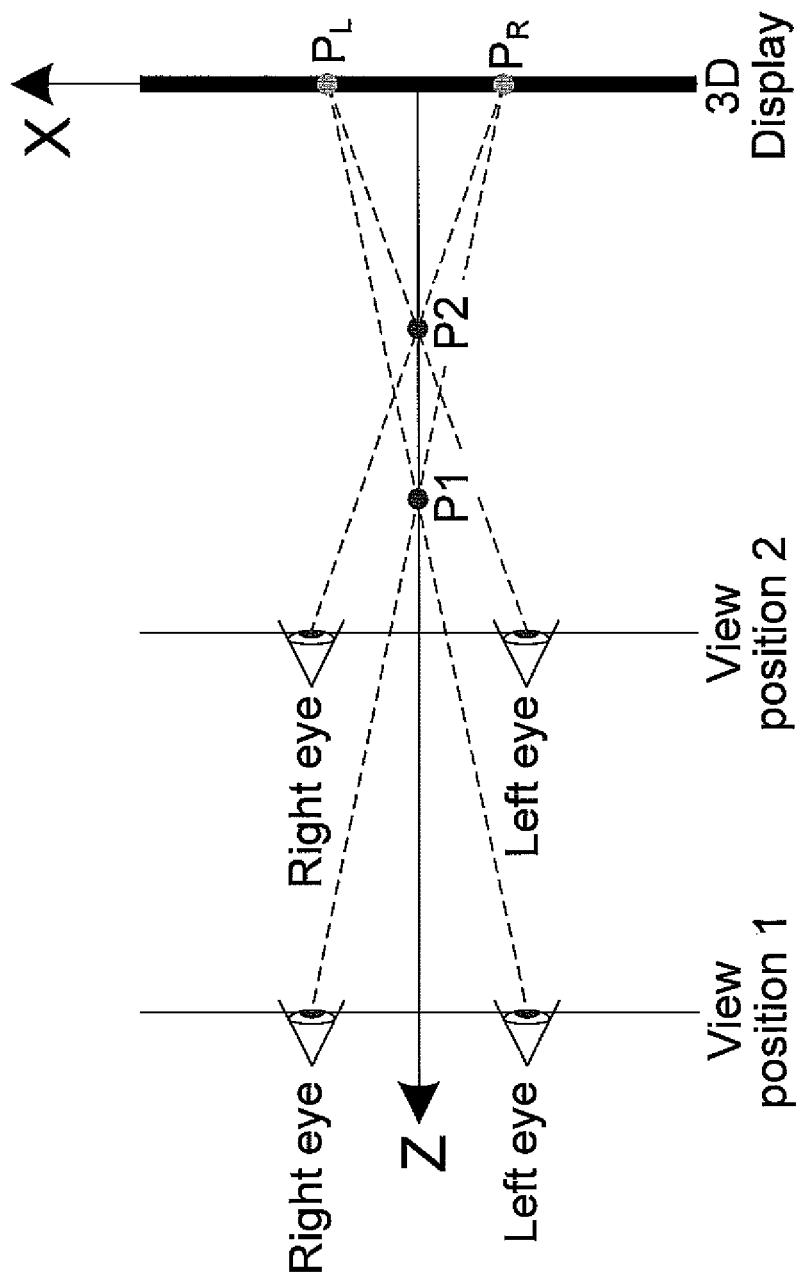

APPARATUS AND METHOD FOR DISPLAYING STEREOSCOPIC IMAGES

This application claims the benefit, under 35 U.S.C. § 365 of International Application PCT/CN2012/087346, filed Dec. 24, 2012, which was published in accordance with PCT Article 21(2) on Jul. 3, 2014 in English.

TECHNICAL FIELD

The disclosed invention generally relates to displaying contents and more specifically relates to a picture-in-picture display technique capable of presenting a plurality of three-dimensional images on a display at the same time.

BACKGROUND ART

In a conventional display apparatus having two-dimensional (2D) picture-in-picture (hereinafter referred to as PIP for short) functionality, input signals from a plurality of sources are respectively outputted to a plurality of zones of the display apparatus, or are processed into a PIP signal which is subsequently outputted to the display apparatus, whereby users can view a plurality of images on a single screen at the same time.

For example, when a user is watching a basketball game on his large screen TV, he may want to know the progress of another football game at the same time. Then the TV system can display the two programs on the single screen of the TV. However, the view of the basketball game occupies a larger part of the screen or even the complete screen so that the user can watch more details, while the football game is displayed in a smaller window on the lower-right corner of the screen, which is beside or in the display zone of the basketball game. Here, the view of the basketball game is the main image while the view of the football game is the sub-image.

FIG. 1 shows an image provided by a TV in a 2D PIP mode. In FIG. 1, a main image 102 and a sub-image 103 are simultaneously displayed on a TV set 101 in the 2D PIP mode. Such a PIP function may satisfy user's demands to simultaneously view a plurality of images on a single screen.

To pursue more realistic visual effects, various stereoscopic display techniques have been developed recently, such as space-multiplexed polarization type stereoscopic display techniques (polarized glasses required), time-multiplexed light valve type stereoscopic display techniques (light valve glasses required), multiple-view stereoscopic display techniques that do not require any stereoscopic glasses, etc. The aforementioned stereoscopic display techniques are all based on the principle of stereoscopic vision of human eyes, and efforts are made to improve display hardware and image processing software, so that an image intended for viewing with the left eye enters the left eye of a viewer and an image intended for viewing with the right eye enters the right eye of the viewer to thereby produce a stereoscopic picture in the brain of the viewer.

A basic idea of 3D stereoscopic display appeared in the 19th century. Because our two eyes are approximately 6.5 cm apart on our head, each eye sees a slightly different angle of view of a scene we are looking at and provides a different perspective. Our brain can then create the feeling of depth within the scene based on the two views observed through our eyes.

FIG. 2 shows an exemplary concept illustration of a 3D stereoscopic display. In this illustration, Z represents the depth direction of a perceived object, and D represents the distance to the screen. There are four objects, a car, a column, a tree and a box. The car is perceived in front of the screen, the column is perceived on the screen, the tree is perceived behind the screen, and the box is perceived at infinite distance. Most modern 3D displays are built based on 3D stereo concepts, with the major difference on how to separate the two views to left and right eyes, respectively.

However, if a viewer moves forward or backward in watching 3D contents on a 3D display, the perceived depth of a given point becomes smaller or larger, shown as the perceived point P1 and P2 in FIG. 3 corresponding to view positions 1 and 2 for the same displayed stereoscopic points $P_L$ and $P_R$ on the 3D display. Therefore, the disparity, i.e. the distance between $P_L$ and $P_R$, is used to replace the depth in many technical documents for a more accurate description. However, the depth is still used at many cases for easy understanding.

For related art, see Marco Accame and Francesco De Natale "Disparity estimation for stereo sequences based on adaptive size hierarchical block matching" (Proceedings of the 8th International Conference, ICIAP'95 San Remo, Italy, Sep. 13-15, 1995) and Hongshi Yan and Jian Guo Liu "Robust Phase Correlation Based Sub-pixel Disparity Estimation" (4th SEAS DTC Technical Conference—Edinburgh 2009).

SUMMARY OF INVENTION

There are some problems when directly applying traditional 2D PIP techniques to stereoscopic display apparatuses. One of the problems is that viewers are apt to confuse the content of the main image with that of the sub-image, especially for the contents adjacent to the border between the two images. Another problem is that viewers can't see a stereoscopic view for some content adjacent to the border between the two images.

In order to overcome the above-stated problems, one object of the present invention is to provide some techniques for displaying a stereoscopic view in a 2D PIP mode.

One aspect of the disclosed invention relates to a stereoscopic display apparatus comprising: a stereo image acquisition unit configured to acquire a first stereo image for a first image and a second stereo image for a second image; a border generation unit configured to generate a border for separating the first image from the second image; and a displaying unit configured to combine the second stereo image and the generated border with the first stereo image and display the combined stereo images.

Another aspect of the disclosed invention relates to a method for displaying a stereo image, comprising: acquiring a first stereo image for a first image and a second stereo image for a second image; generating a border for separating the first image from the second image; combining the second stereo image and the generated border with the first stereo image; and displaying the combined stereo images.

BRIEF DESCRIPTION OF DRAWINGS

FIG. 2 shows an exemplary concept illustration of 3D stereoscopic display;

FIG. 3 shows an exemplary illustration of different 3D depth values viewing from different distances;

EMBODIMENTS FOR CARRYING OUT THE INVENTION

Figure 1:
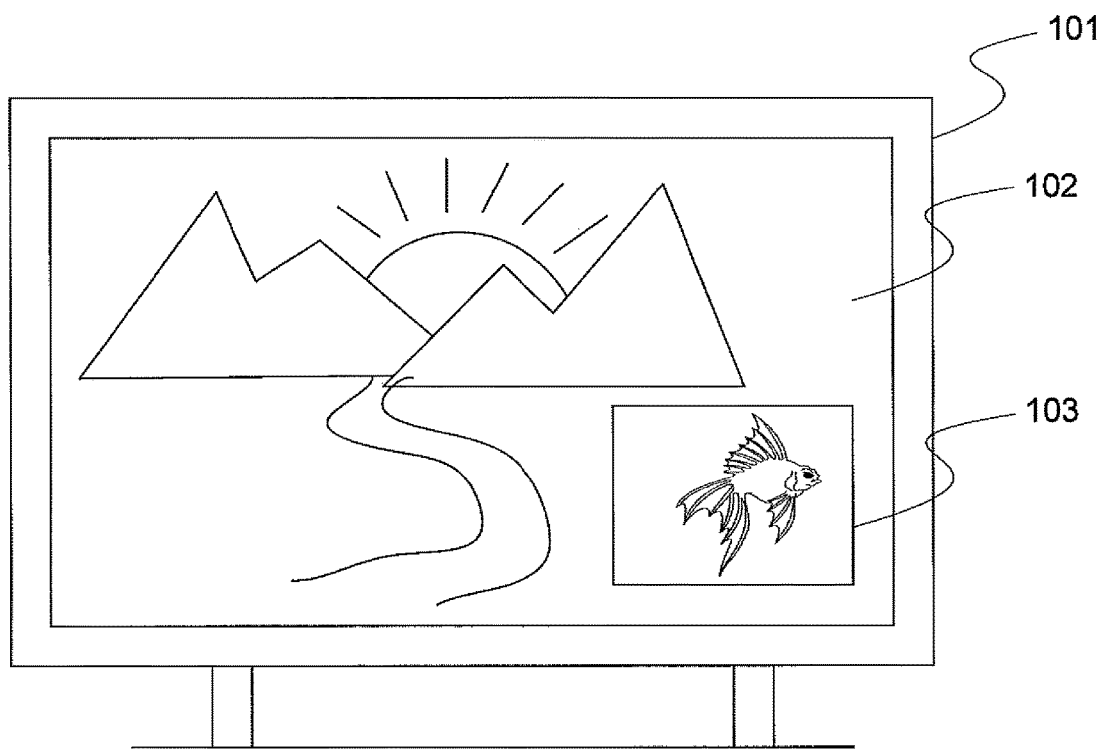
FIG. 1 shows an image provided by a TV in a 2D PIP mode.

Certain exemplary embodiments of the present invention will now be described in greater detail with reference to the accompanying drawings. The following description is not to be taken in a limiting sense, but is made merely for the purpose of describing the general principles of exemplary embodiments.

In the following description, same reference numerals are used for the same elements even in different drawings. The subject matter defined in the description, such as detailed construction and elements, is provided to assist in a comprehensive understanding of the invention. Thus, it is apparent that exemplary embodiments of the present invention can be carried out without the specifically defined subject matter. Also, well-known structures, materials, or operations are not shown or described in detail to avoid obscuring aspects of the invention.

References throughout this specification to "one embodiment", "an embodiment" or similar language means that a particular feature, structure, or characteristic described in connection with the embodiment are included in at least one embodiment of the present invention. Thus, appearances of the phrases "in one embodiment", "in an embodiment", and similar language throughout this specification may, but do not necessarily, all refer to the same embodiment.

Figure 4A:
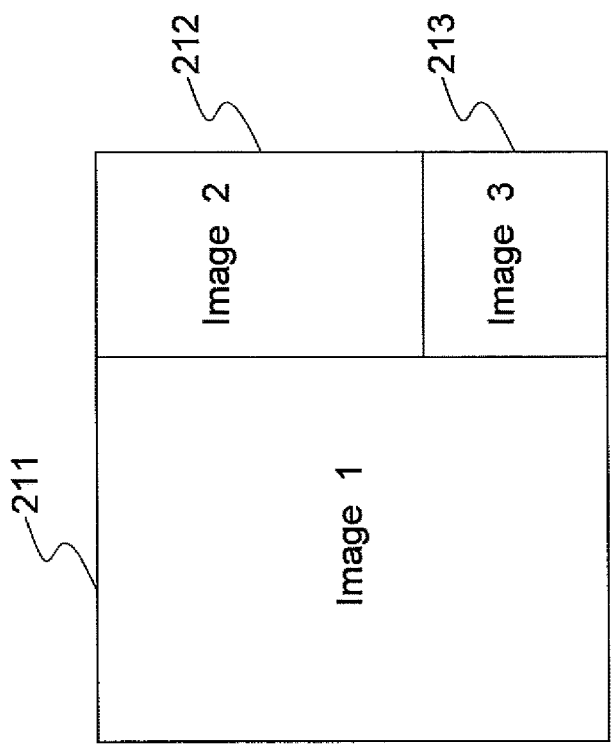
FIGS. 4A and 4B show exemplary arrangements of main images and sub-images.
Figure 4B:
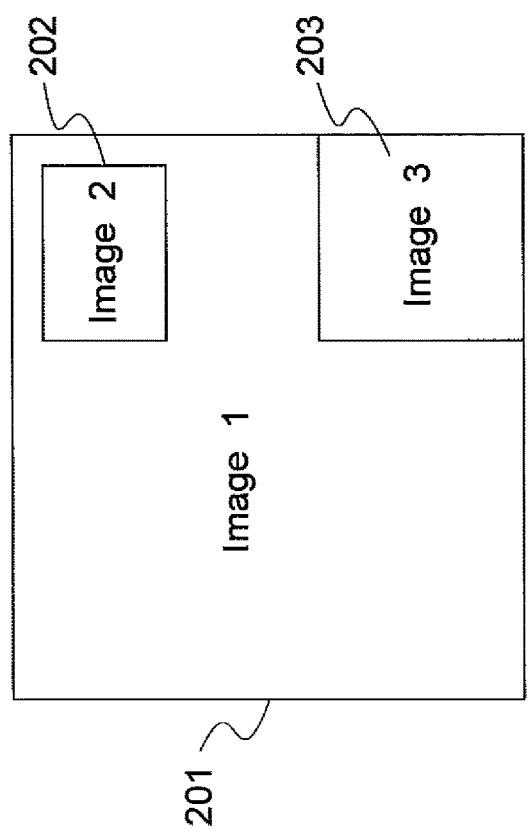

In traditional 2D PIP applications, a plurality of pictures are displayed as picture in picture or picture by picture, as shown in FIG. 4. In FIG. 4A, a sub-image 202 is displayed in the display zone of a main image 201, and a sub-image 203 is displayed in the lower-right corner of the display zone of the main image 201. In FIG. 4B, a main image 211, a sub-image 212, and a sub-image 213 are displayed side by side.

There are some problems when directly applying such traditional 2D PIP techniques to stereoscopic display apparatuses. One of the problems is that it's difficult for viewers to distinguish the contents between the main image and the sub-image in a 3D space, especially for the contents at the border of the two images.

In one embodiment of the present invention, an additional border is added to separate the two images.

Figure 5B:
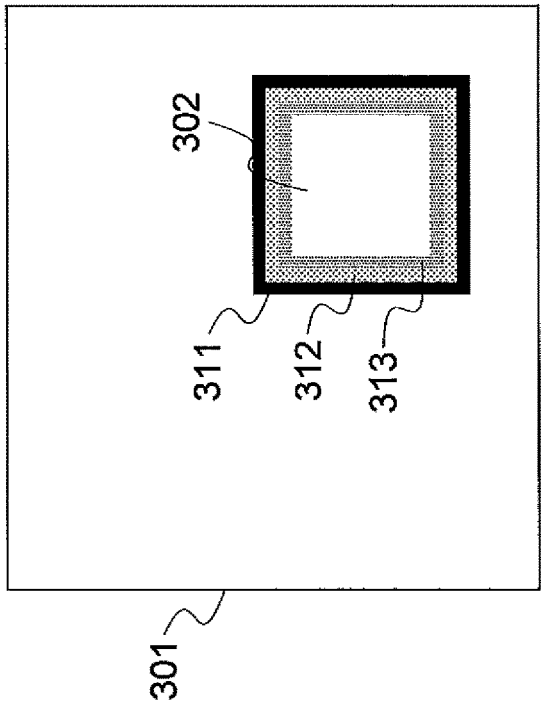
FIGS. 5A and 5B show exemplary borders provided between main images and sub-images.
Figure 5A:
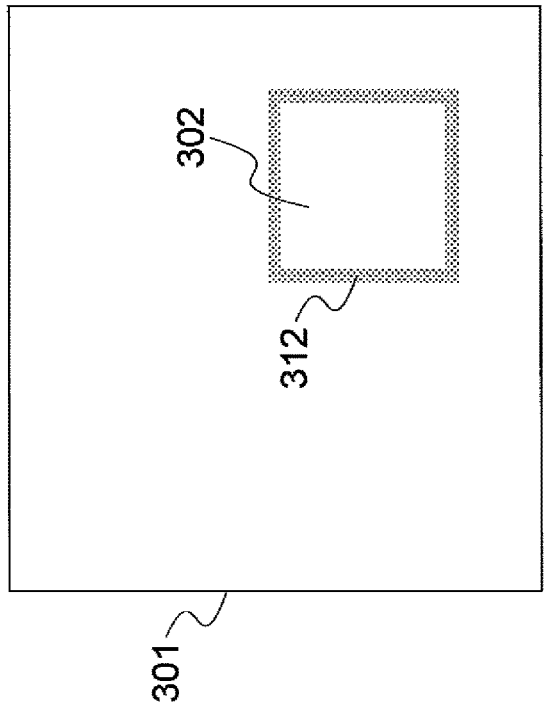

As shown in FIG. 5A, an additional border 312 is used to separate a main image 301 and a sub-image 302. The border should be wide enough so that viewers can easily distinguish the content in the main image 301 from that in the sub-image 302. The border 312 can be any color, or a combination of colors, or a strip of picture.

In one embodiment of the present invention, a 2D border may be used. In other embodiments of the present invention, a 3D border may be used. In one embodiment, the depth of the 3D border may be constant. In one embodiment of the present invention, the depth of the 3D border may change dynamically according to the depth of the content adjacent to the border.

A stereoscopic display apparatus according to embodiments of the present invention is described in detail below. In the embodiments below, an additional border is added to separate two images, first and second images, so that viewers may easily distinguish the contents between the first image and the second image in a 3D space. The first image may serve as a main image, and the second image may serve as a sub-image in a PIP display mode. The stereoscopic display apparatus may be a TV set, a personal computer, a smart phone, a tablet or any other apparatus including a display device for displaying data or information.

Figure 6:
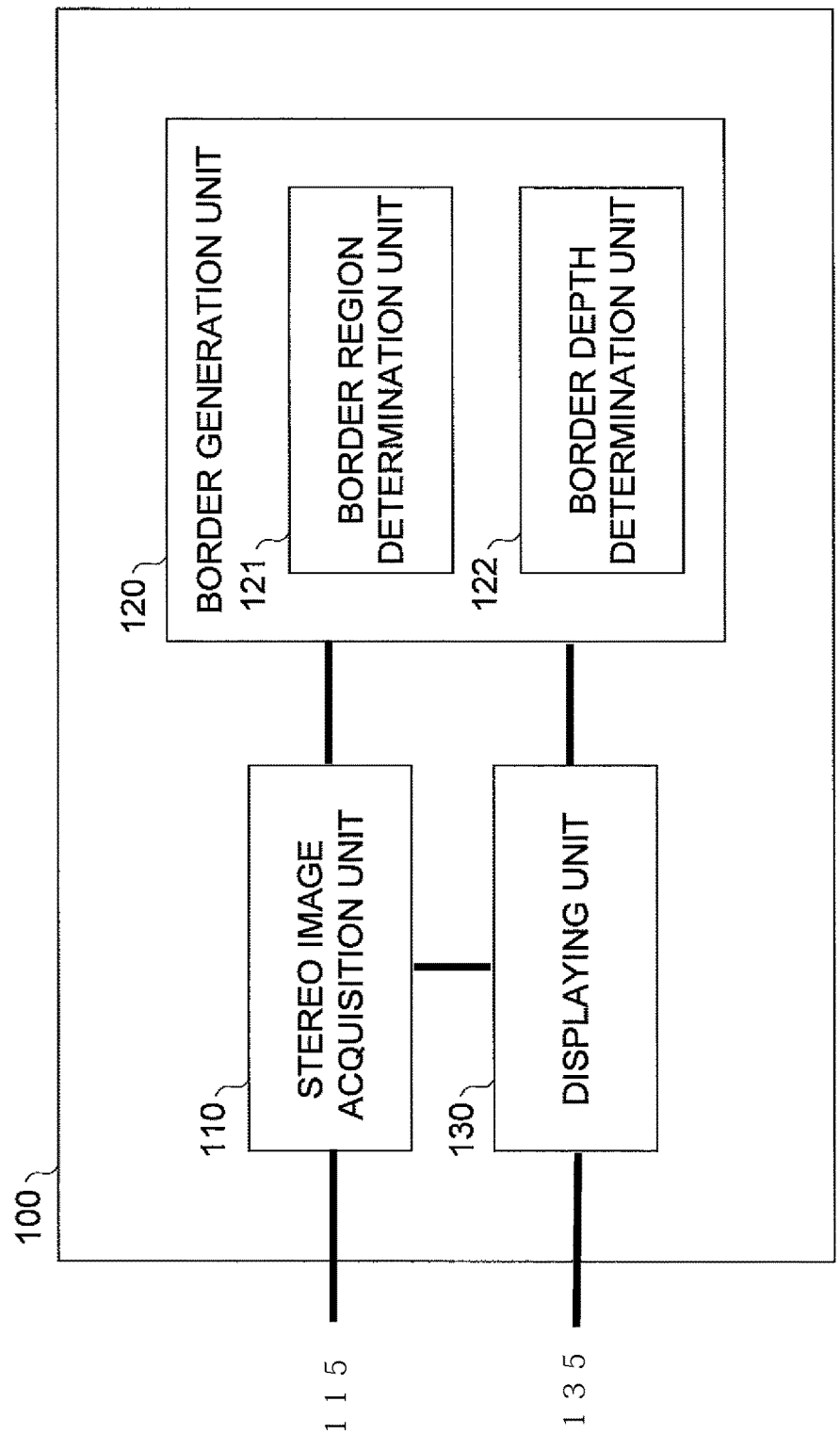
FIG. 6 shows an exemplary arrangement of a stereoscopic display apparatus according to one embodiment of the present invention.

FIG. 6 shows an exemplary arrangement of a stereoscopic display apparatus according to one embodiment of the present invention.

Referring to FIG. 6, a stereoscopic display apparatus 100 includes a stereo image acquisition unit 110, a border generation unit 120 and a displaying unit 130.

The stereo image acquisition unit 110 acquires a first stereo image for a first image and a second stereo image for a second image from internal or external sources 115. Typically, the first and second images may serve as a main image and a sub-image in a PIP mode, respectively. In 3D display, the stereo image acquisition unit 110 may further acquire depth information or a depth map for the stereo images together.

The border generation unit 120 generates a border for separating the first image from the second image. In one embodiment, the border generation unit 120 includes a border region determination unit 121 and a border depth determination unit 122.

The border region determination unit 121 determines a border region including contents adjacent to the border. The border region has a width of pixels around the border. For example, the border region may include a predetermined number of pixels in the first and second stereo images adjacent to the border. In other words, the border region consists of some pixels in the first stereo image, the border itself and some pixels in the second stereo image.

The border depth determination unit 122 generates the border region with depth information by determining depth of pixels in the border region based on coordinates of the respective pixels and a depth range of the pixels in the border region. By using the border region having the depth information, the stereoscopic display apparatus 100 can display the border three-dimensionally, for example, by displaying the border like a wall having a width and a height.

The displaying unit 130 combines the second stereo image and the generated border with the first stereo image and displays the combined stereo images on a display device 135.

Figure 7:
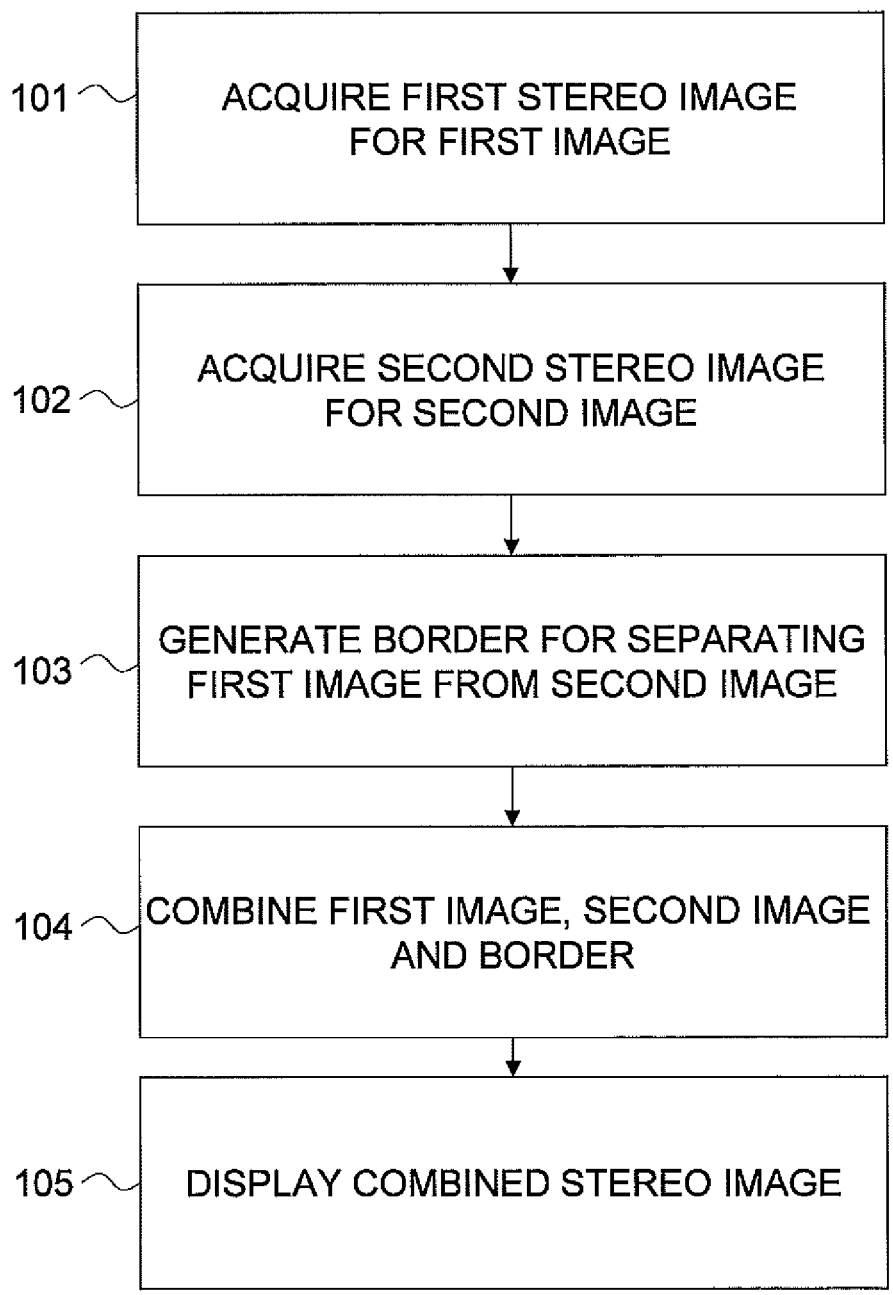
FIG. 7 shows a flowchart illustrating an exemplary method for displaying a stereo image according to one embodiment of the present invention.

FIG. 7 shows a flowchart illustrating an exemplary method for displaying a stereo image according to one embodiment of the present invention.

Referring to FIG. 7, at Step 101, the stereo image acquisition unit 110 acquires a first stereo image for a first image from an internal or external source.

At Step 102, the stereo image acquisition unit 110 acquires a second stereo image for a second image from the internal or external source.

At Step 103, the border generation unit 120 generates a border for separating the first image from the second image in a PIP mode. The border may be the border itself or consist of a border region as stated above.

At Step 104, the displaying unit 130 combines the first image, the second image and the border or the border region. For example, the displaying unit 130 may superimpose the second image and the border or the border region onto predetermined positions in the first image.

At Step 105, the displaying unit 130 displays the combined stereo image on a display device.

A stereoscopic display apparatus according to another embodiment of the present invention is described with reference to FIGS. 8-10. In this embodiment, a 3D border having a depth changing dynamically based on the depth of adjacent contents in first and second images is used.

Figure 8:
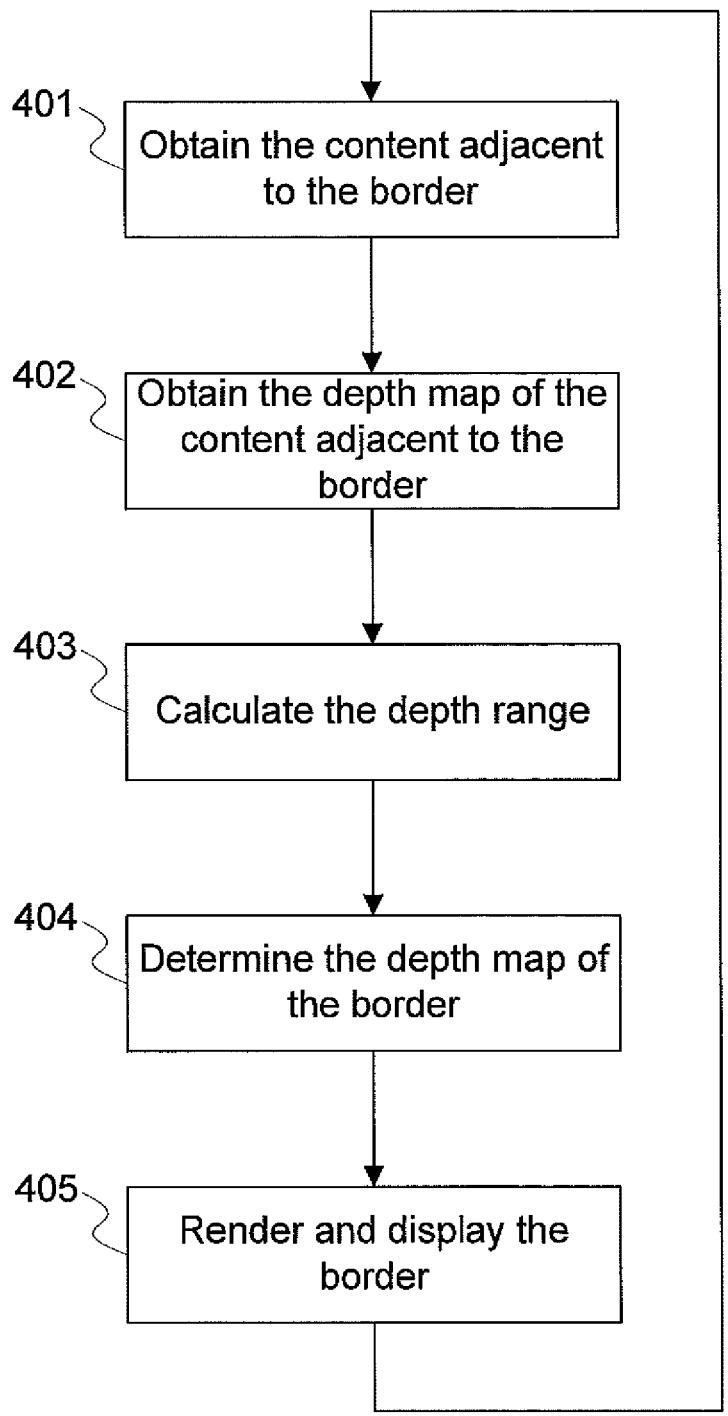
FIG. 8 shows a flowchart illustrating an exemplary method for displaying a stereo image according to one embodiment of the present invention.
Figure 9:
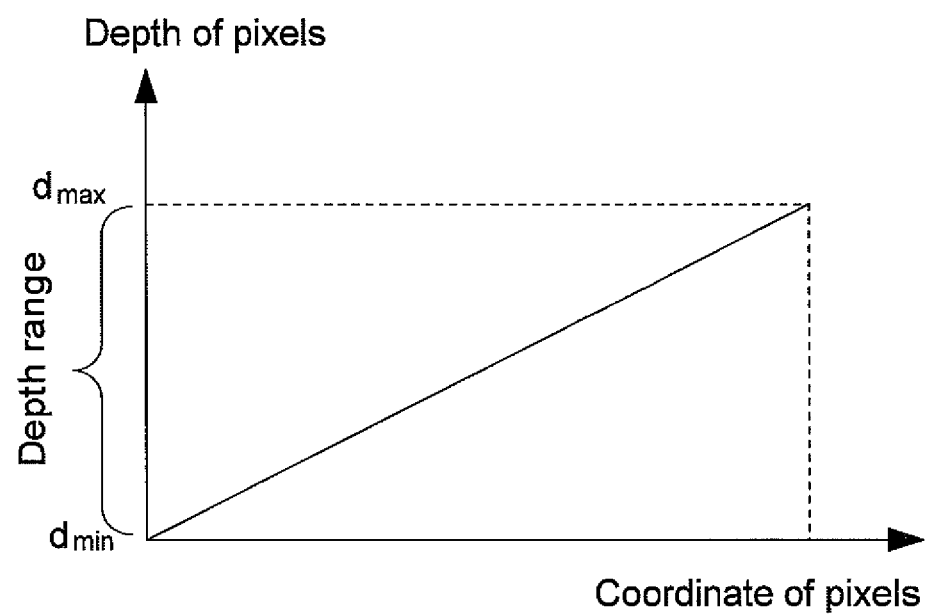
FIG. 9 shows an exemplary linear mapping between depth of pixels and coordinates thereof.

FIG. 8 is a flowchart showing an exemplary method for dynamically changing the depth of a 3D border according to one embodiment of the present invention.

At Step 401, stereo images are obtained both for a main image and a sub-image. For imagery contents, they can be pairs of images for left and right eye views. For computer graphics, a 3D model and a rendering method (including camera separation and focal length) are obtained. Then, contents adjacent to a border between the main image and the sub-image are determined. As shown in FIG. 5B, a narrow or broad region between contents 311 in the main image 301 and contents 313 in the sub-image 302 adjacent to the border 312 is determined. For example, the contents 311 may be determined as an outer area in the main image 301 externally surrounding the border 312 with a thickness of a predetermined number of pixels from the border 312. The contents 313 may be determined as an inner area in the sub-image 302 internally surrounding the border 312 with a thickness of a predetermined number of pixels from the border 312. In this case, the narrow region may be determined as an area consisting of the contents 311, the border 312 and the contents 313. Also, the thickness of the contents 311 and 313 may be dynamically determined, for example, depending on the display size and/or similarity of the contents 311 and 313. Also, the thickness of the contents 311 and 313 may be adjusted through user's manipulation. If the user cannot successfully distinguish the main image 301 and the sub-image 302, the thickness of the contents 311 and 313 may be set to be greater. However, the determination of the narrow region according to the present invention is not limited to it, and any other appropriate determination method may be applied.

At Step 402, a depth map for the contents 311 and 313 adjacent to the border 312 in both the main image 301 and the sub-image 302 is obtained. The depth map may be obtained in any appropriate conventional method. For imagery contents, the depth of each pixel may be recorded at the time of capture. If a stereo image pair has been captured without depth information, there are several existing methods in the prior art to obtain this depth map, including block matching and phase correlation. For contents that are generated using computer graphics, the depth map can be obtained through analytical calculation, given the knowledge of the 3D model and the rendering method.

At Step 403, a depth range for the contents 311 and 313 adjacent to the border is calculated. As shown in FIG. 9, the depth range indicates the minimum depth $d_{min}$ and the maximum depth $d_{max}$ of the contents 311 and 313 adjacent to the border 312.

Figure 10B:
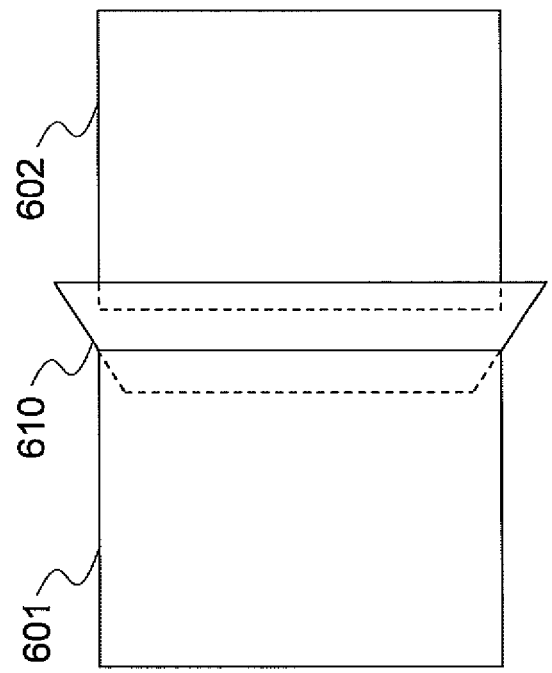
FIGS. 10A and 10B show an exemplary case where a part of a border horizontally separates two images.
Figure 10A:
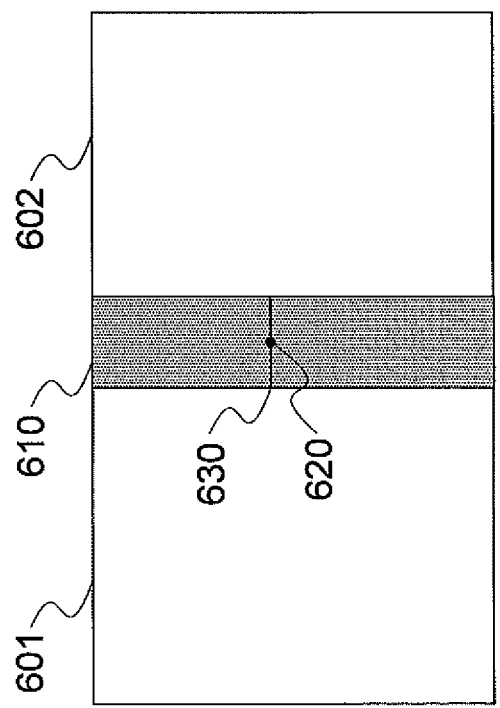

Based on the depth range, the depth map of the border 312 is determined at Step 404. There are many methods to determine the depth map of the border 312. FIG. 9 shows an example of linear mapping between the depth and the coordinate of pixels. FIGS. 10A and 10B show a case where a part of the border 610 horizontally separates two images. For a pixel 620 on the border 610 that horizontally separates a main image 601 and a sub-image 602, the depth d of the pixel 620 can be calculated by its x-coordinate x as:

$$\frac{d - d_{min}}{d_{max} - d_{min}} = \frac{x - x_{min}}{x_{max} - x_{min}} \quad (1)$$

where $x_{min}$ and $x_{max}$ are the minimum and maximum x-coordinates, respectively, of pixels on the horizontal line 630, and $d_{min}$ and $d_{max}$ are the minimum and maximum depth values, respectively, in the depth range obtained at Step 403. In stereoscopic display, the part of the border 610 will look like a wall between the two images, as shown in FIG. 10B, which will prevent viewers from confusing contents of the main image 601 with those of the sub-image 602.

At Step 405, the additional border looking like the wall to the viewers is rendered and displayed according to the depth map obtained at Step 404.

A stereoscopic display apparatus according to another embodiment of the present invention is described with reference to FIGS. 11-12. In this embodiment, the depth of a sub-image is adjusted dynamically to make sure that all pixels of a main image around the sub-image are always behind or in front of the pixels of the sub-image adjacent to the border. As a result, there is an obvious depth change on the border of the two images so that viewers won't confuse the contents of one image with that of another image.

In this embodiment, instead of providing such an additional border to separate two images, in some embodiments of the present invention, the depth of the sub-image 602 is adjusted dynamically to make sure that all pixels of the main image 601 around the sub-image 602 are always behind or in front of the pixels of the sub-image 602 adjacent to the border 610. As a result, there is an obvious depth change on the border 610 of the two images so that viewers won't confuse the contents of one image with that of another image.

Figure 11:
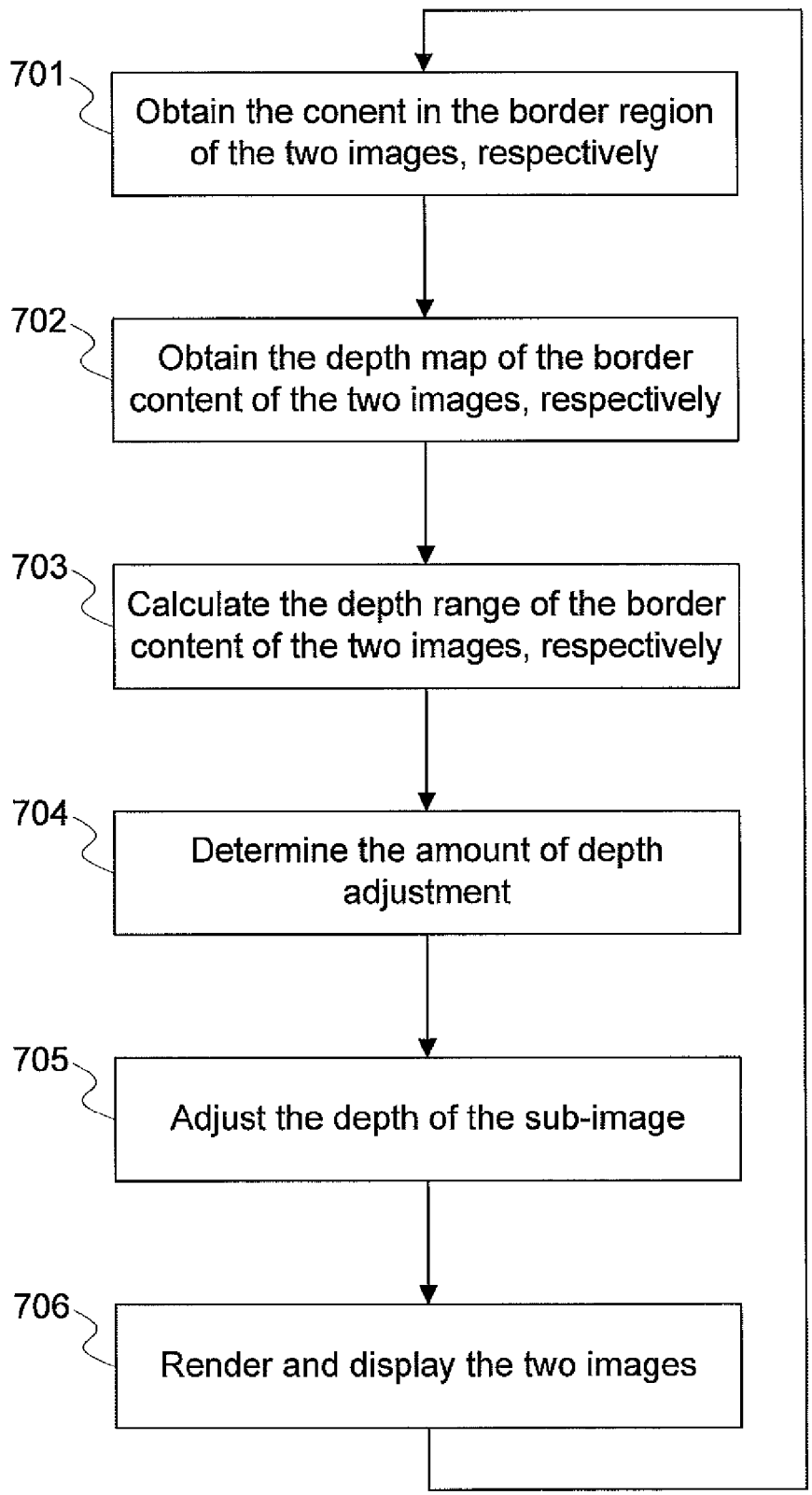
FIG. 11 shows a flowchart illustrating an exemplary method for displaying a stereo image according to one embodiment of the present invention.
Figure 12:
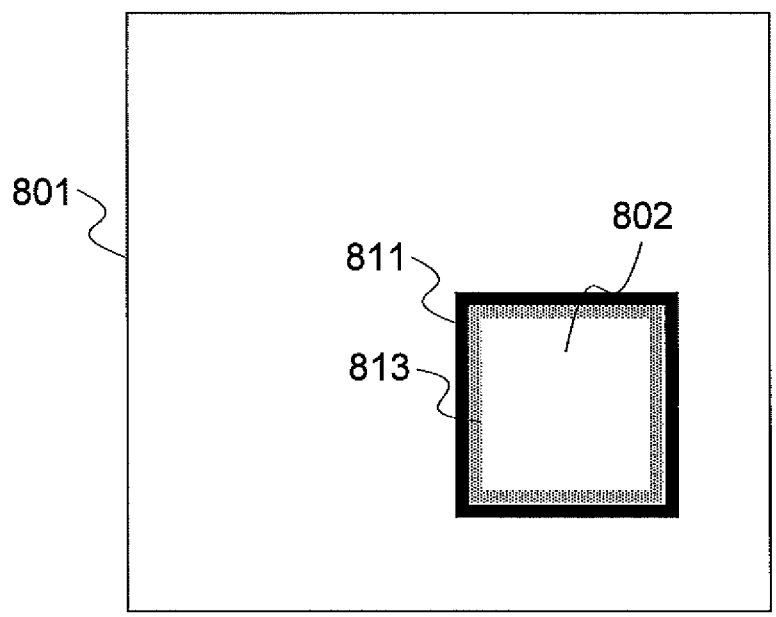
FIG. 12 shows an exemplary stereoscopic view according to one embodiment of the present invention.

FIG. 11 shows a flow chart of an exemplary method for dynamically changing the depth of a 3D border according to another embodiment of the present invention.

Referring to FIG. 11, at Step 701, stereo images are obtained both for a main image and a sub-image, respectively. For imagery content, they can be pairs of images for left and right eye views. For computer graphics, a 3D model and a rendering method (including camera separation and focal length) are obtained. Then, contents adjacent to a border between the main image and the sub-image are determined, respectively. As shown in FIG. 12, a narrow region of contents 811 in the main image 801 and contents 813 in the sub-image 802 is determined.

At Step 702, depth maps for the contents 811 and 813 of the border regions of the two images are obtained, respectively. For imagery contents, the depth of each pixel may be recorded at the time of capture. If a stereo image pair has been captured without depth information, there are several existing methods in the prior art to obtain the depth maps, including block matching and phase correlation. For contents that are generated using computer graphics, the depth map can be obtained through analytical calculation, given the knowledge of a 3D model and a rendering method.

At Step 703, the depth ranges for the contents 811 and 813 of the border regions of the two images are calculated, respectively. The depth range for the border region of the main image 801 is defined by the minimum depth $d_{main\_min}$ and the maximum depth $d_{main\_max}$, and the depth range for the border region of the sub-image 802 is defined by the minimum depth $d_{sub\_min}$ and the maximum depth $d_{sub\_max}$.

Then, at Step 704, the amount of depth adjustment δ is determined based on a threshold of depth difference $d_{threshold}$. The threshold of depth difference $d_{threshold}$ makes sure that the sub-image 802 is in front of or behind the main image 801 at a certain degree. The threshold of depth difference $d_{threshold}$ can be input by a user or pre-defined by the system.

In the case that the sub-image 802 is designed to be in front of the main image 801, the depth adjustment δ can be calculated as:

$$\delta = d_{main\_max} + d_{threshold} - d_{sub\_min} \text{ (if } d_{main\_max} + d_{threshold} > d_{sub\_min})$$

or $$\delta = 0 \text{ (if } d_{main\_max} + d_{threshold} \leq d_{sub\_min})$$

In the case that the sub-image 802 is designed to be behind the main image 801, the depth adjustment δ can be calculated as:

$$\delta = d_{sub\_max} - d_{main\_min} + d_{threshold} \text{ (if } d_{main\_min} - d_{threshold} > d_{sub\_max})$$

or $$\delta = 0 \text{ (if } d_{main\_min} - d_{threshold} \leq d_{sub\_max})$$

At Step 705, the depth of the sub-image 802 is adjusted. In the case that the sub-image 802 is designed to be in front of the main image 801, the depth of each pixel of the sub-image 802 will be increased by the amount of depth adjustment δ. In the case that the sub-image 802 is designed to be behind the main image 801, the depth of each pixel of the sub-image 802 will be decreased by the amount of depth adjustment δ.

Then, the main image 801 and the adjusted sub-image 802 will be rendered and displayed at Step 706.

A stereoscopic display apparatus according to another embodiment of the present invention is described with reference to FIGS. 13-15. In this embodiment, some pixels in a sub-image are hidden by pixels in a main image so that visual effect is improved by providing viewers with a more stereoscopic view of contents adjacent to a border between the two images. When directly applying traditional 2D PIP techniques to stereoscopic display apparatuses, another major problem is that viewers can't see a stereoscopic view for some contents adjacent to the border of the two images.

Figure 13A:
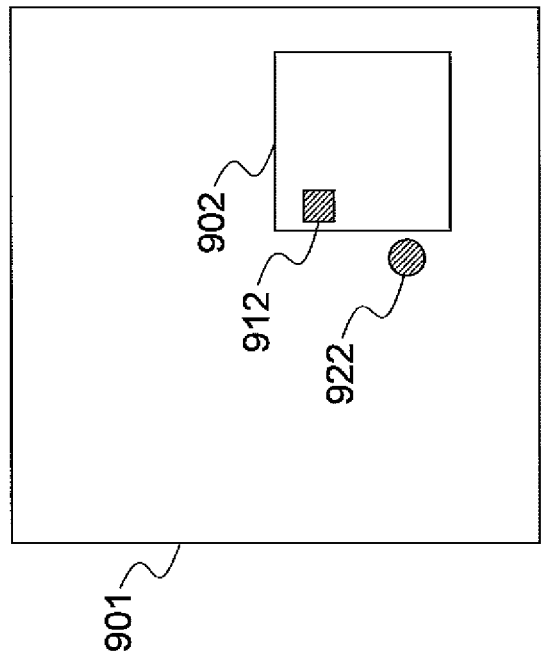
FIGS. 13A and 13B show left and right views of a stereoscopic view according to one embodiment of the present invention.
Figure 13B:
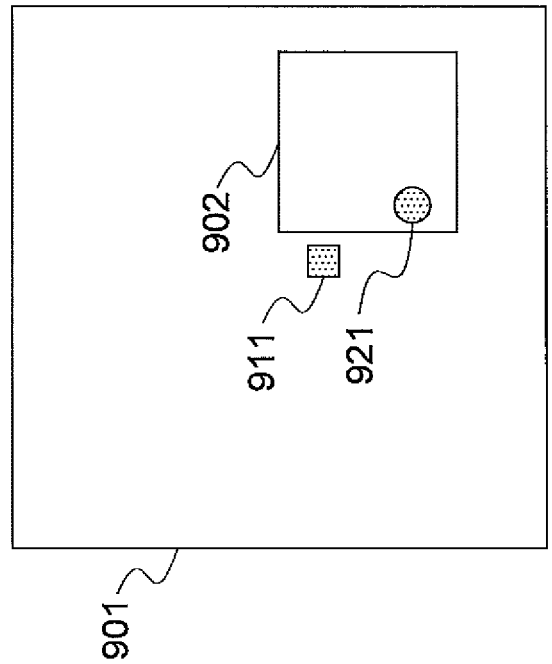

FIGS. 13A and 13B show a left eye image and a right eye image of a 3D scene, respectively. A left view 911 of a rectangle object in a main image 901 is shown in the left eye image. However, a right view 912 of the rectangle object in the main image 901 is within the display zone of a sub-image 902 in the right eye image. Without the sub-image 902, the left view 911 and the right view 912 of the rectangle object will be viewed by the left eye and the right eye of a viewer, respectively. As a result, a stereoscopic view of the rectangle object will be produced in the brain of the viewer, and the viewer will see the rectangle object sunk into the screen. When the sub-image 902 is displayed, the viewer can only see the left view of the rectangle object by his left eye. Therefore, the viewer won't see a stereoscopic view of the rectangle object. The viewer will see the rectangle object just on the screen rather than sunk into the screen.

The same problem will occur when the left view of an object is occluded by the sub-image 901. As shown in FIG. 13A, a left view 921 of the circular object is in the display zone of the sub-image 902. Without the sub-image 902, the left view 921 and a right view 922 of the circular object will be viewed by the left eye and the right eye of a viewer, respectively. As a result, a stereoscopic view of the circular object will be produced in the brain of the viewer, and the viewer will see the circular object out of the screen. When the sub-image is displayed, the viewer can only see the right view of the circular object by his right eye. Therefore, the viewer won't see a stereoscopic view of the circular object. The viewer will see the circular object just on the screen rather than out of the screen.

To pursue more realistic visual effects, in this embodiment of the present invention, a method is used to decrease the loss of stereoscopic vision for contents of a main image adjacent to a border. The method handles the contents adjacent to the border between the main image and a sub-image and decides which view of each pixel should be ignored and won't be displayed.

Figure 14A:
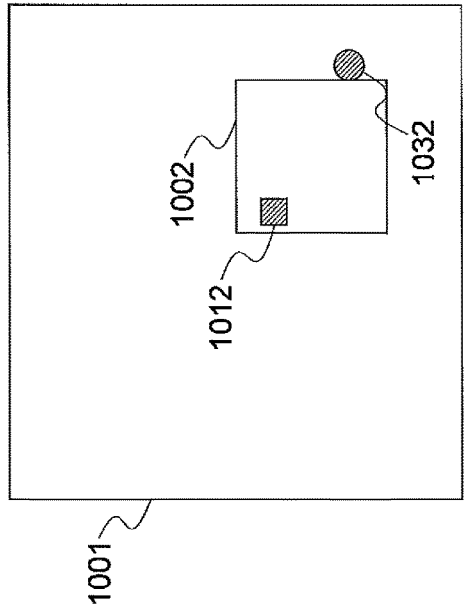
FIGS. 14A-14D show left and right views of a stereoscopic view according to one embodiment of the present invention.
Figure 14B:
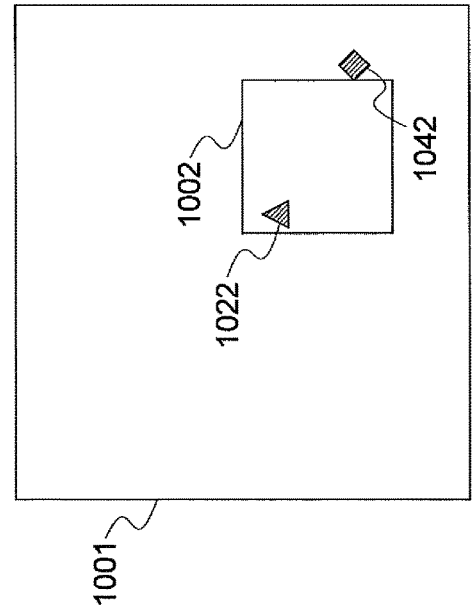
Figure 14C:
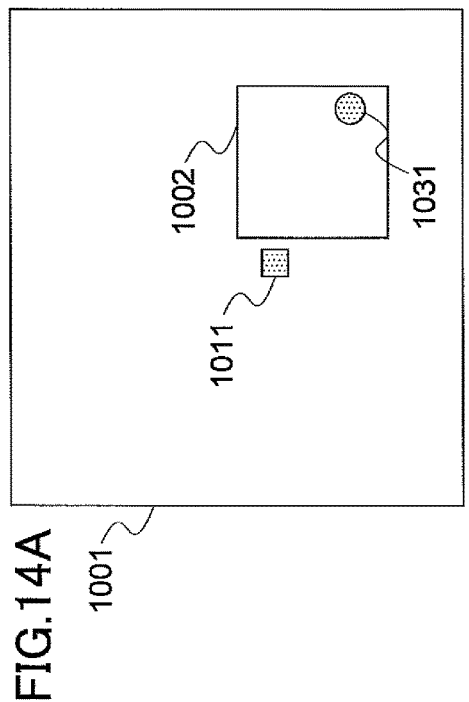
Figure 14D:
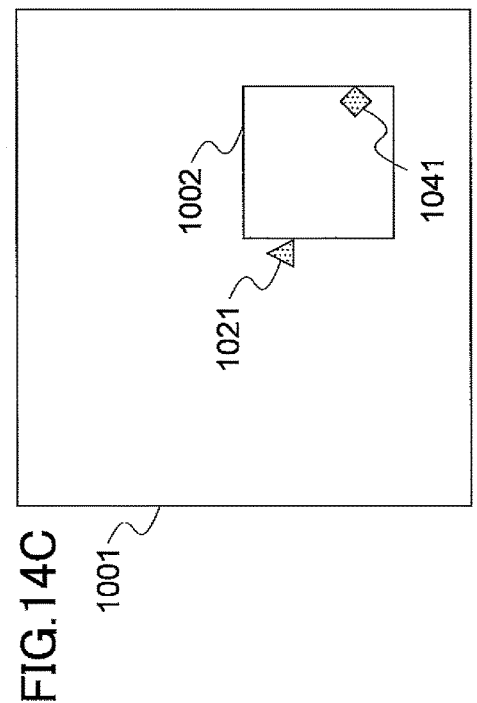

As shown in FIG. 14B, a right view 1012 of a rectangle object in a main image 1001 is occluded by a sub-image 1002, and in FIG. 14C, a left view 1021 of a triangle object in a sub-image 1002 is cut out during a capturing or post-processing procedure, because it is out of scope. Therefore, the viewer won't see a stereoscopic view for both the rectangle object and the triangle object. However, if the system finds that the right view 1012 of the rectangle object of the main image 1001 is displayed at the same screen position as the right view 1022 of the triangle object of the sub-image 1002, the system will ignore the right view 1022 of the triangle object of the sub-image 1002 while displaying the right view 1012 of the rectangle object of the main image 1001 in the display zone of the sub image 1002. Therefore, the viewer won't see any view of the triangle object. However, the viewer can see both the left view and the right view of the rectangle object. As a result, the triangle object is hidden while a stereoscopic view of the rectangle object is viewed by the viewer. The triangle object is at the edge of the sub-image 1002, and the resolution of the sub-image 1002 is usually low. Therefore, the missing of the triangle object has little impact on the viewer's visual effect. However, the rectangle object is at the center of the main image 1001 where the region of interest (ROI) is usually positioned, and the resolution of the main image 1001 is usually high. Therefore, restoring the stereoscopic view of the rectangle object will improve the viewer's visual effect significantly.

Figure 15:
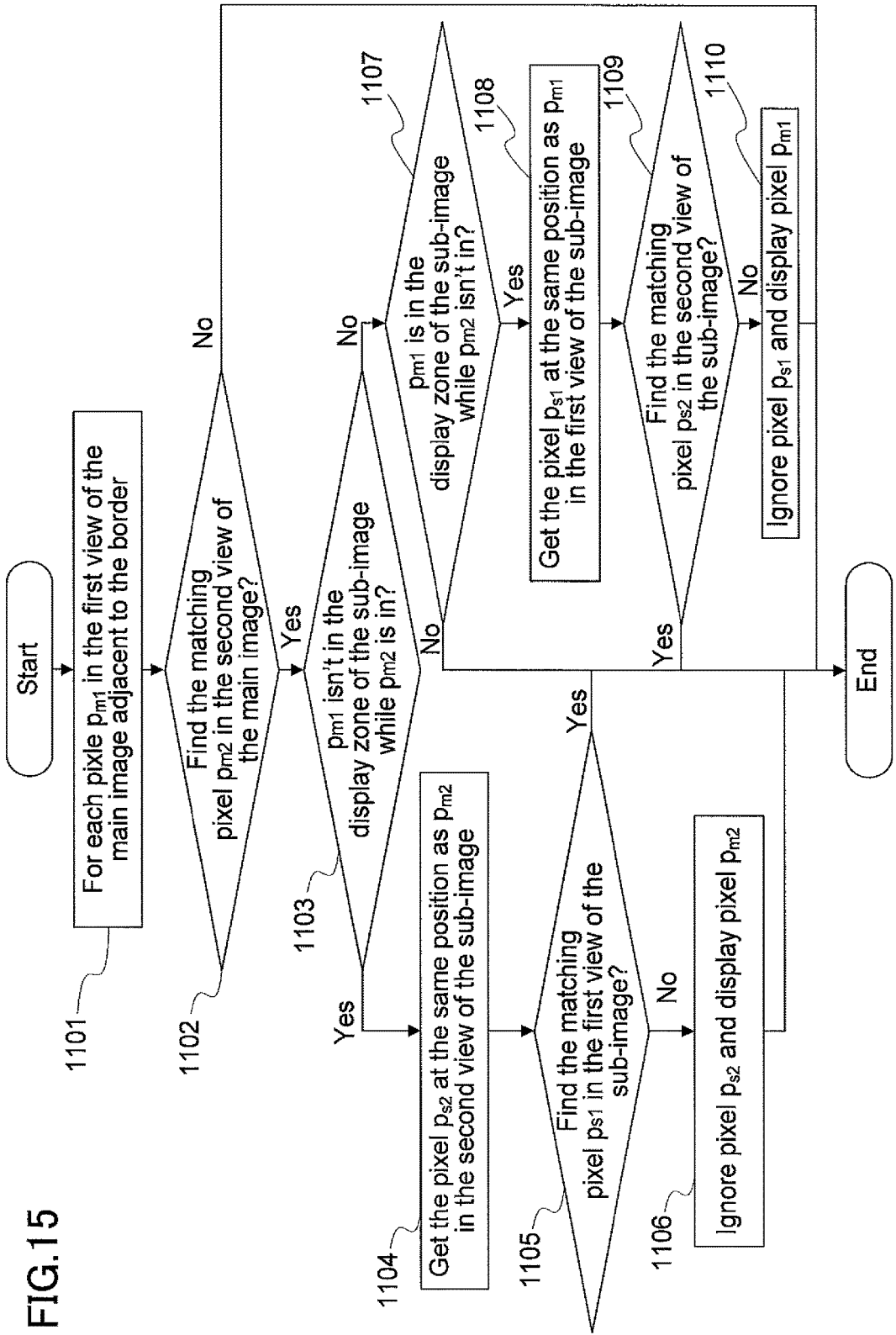
FIG. 15 shows a flowchart illustrating an exemplary method for displaying a stereo image according to one embodiment of the present invention.

FIG. 15 is a flowchart of an exemplary method according to one embodiment of the present invention.

Referring to FIG. 15, at Step 1101, for each of the left view and right view of the main image 1001, a pixel $p_{m1}$ adjacent to a border between the main image 1001 and the sub-image 1002 is obtained.

Then, at Step 1102, the system looks for a matching pixel $p_{m2}$ for pixel $p_{m1}$ in the second view of the main image 1001. There are several existing methods in the prior art to search for the matching pixel $p_{m2}$. If the matching pixel $p_{m2}$ has not been found, the system continues to handle other pixels of the main image 1001 adjacent to the border. Otherwise, the system will check if one of the two pixels is in the display zone of the sub-image 1002 while the other isn't in. If the system finds at Step 1103 that the pixel $p_{m1}$ in the first view isn't in the display zone of the sub-image 1002 while the matching pixel $p_{m2}$ in the second view is in, a pixel $p_{s2}$ at the same position as pixel $p_{m2}$ in the second view of the sub-image 1002 will be obtained at Step 1104.

Then, the system will look for the matching pixel $p_{s1}$ for pixel $p_{s2}$ in the first view of the sub-image 1002 at Step 1105. If the matching pixel $p_{s1}$ for pixel $P_{s2}$ in the first view of the sub-image 1002 doesn't exist, the system will ignore pixel $p_{s2}$ while displaying pixel $P_{m2}$ at Step 1106. In other word, pixel $p_{s2}$ is hidden by pixel $p_{m2}$.

On the other hand, if the system finds at Step 1107 that the pixel $p_{m1}$ in the first view is in the display zone of the sub-image 1002 while the matching pixel $p_{m2}$ in the second view isn't in, the pixel $p_{s1}$ at the same position as pixel $p_{m1}$ in the first view of the sub-image 1002 will be obtained at Step 1108.

Then, the system will look for the matching pixel $p_{s2}$ for pixel $p_{s1}$ in the second view of the sub-image 1002 at Step 1109. If the matching pixel $p_{s2}$ for pixel Psi in the second view of the sub-image doesn't exist, the system will ignore pixel $p_{s1}$ while displaying pixel $P_{m1}$ at Step 1110. In other word, pixel $p_{s1}$ is hidden by pixel $p_{m1}$.

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. Separation of the embodiments or items are not essential to the present invention, and two or more embodiments or items may be combined as needed. Alternatively, an item may be applied to another item (if not inconsistent). For convenience of explanation, the stereoscopic display apparatus according to the embodiments has been described with reference to functional block diagrams, but the stereoscopic display apparatus may be implemented in hardware, software or combinations thereof. The software may be stored in any appropriate storage medium such as a RAM (Random Access Memory), a flash memory, a ROM (Read-Only Memory), an EPROM, an EEPROM, a register, a hard disk drive (HDD), a removable disk, a CD-ROM, a database and a server.

The present invention is not limited to the above embodiments, and variations, modifications, alterations and substitutions can be made by those skilled in the art without deviating from the spirit of the present invention.

The invention claimed is:

1. A stereoscopic display apparatus comprising:
a stereo image acquisition unit configured to acquire a first stereo image for a first image and a second stereo image for a second image;
a border generation unit configured to generate a border for separating the first image from the second image with a border region having depth information by adjusting depth of pixels in the border region based on a depth range of pixels adjacent to the border, such that the second image seems to be in front of or behind the first image; and
a displaying unit configured to combine the second stereo image and the generated border with the first stereo image and display the combined stereo images.

2. The stereoscopic display apparatus as claimed in claim 1, wherein the border generation unit further comprises a border region determination unit configured to determine a border region including contents adjacent to the border, the border region including a number of pixels in the first and second stereo images adjacent to the border.

3. The stereoscopic display apparatus as claimed in claim 2, wherein the border generation unit further comprises a border depth determination unit configured to generate the border region with depth information by determining depth of pixels in the border region based on coordinates of the respective pixels and the depth range.

4. The stereoscopic display apparatus as claimed in claim 3, wherein the border depth determination unit determines the depth of pixels in accordance with $$\frac{d - d_{min}}{d_{max} - d_{min}} = \frac{x - x_{min}}{x_{max} - x_{min}}$$

where $x_{min}$ and $x_{max}$ are the minimum and maximum x-coordinates of the pixels, respectively, and $d_{min}$ and $d_{max}$ are the minimum and maximum depth values in the depth range, respectively.

5. The stereoscopic display apparatus as claimed in claim 1, wherein the border generation unit increases the depth of the pixels in the border region in the second image by a depth adjustment amount derived from a maximum depth value in the border region in the first image and a minimum depth value in the border region in the second image to put the second image in front of the first image.

6. The stereoscopic display apparatus as claimed in claim 1, wherein the border generation unit decreases the depth of the pixels in the border region in the second image by a depth adjustment amount derived from a minimum depth value in the border region in the first image and a maximum depth value in the border region in the second image to put the second image behind the first image.

7. The stereoscopic display apparatus as claimed in claim 2, wherein the displaying unit determines which of the pixels in the border region are to be displayed either in the first stereo image or the second stereo image based on positional relationships of matching contents.

8. A method for displaying a stereo image, comprising:
acquiring a first stereo image for a first image and a second stereo image for a second image;
generating a border for separating the first image from the second image with a border region having depth information by adjusting depth of pixels in the border region based on a depth range of pixels adjacent to the border, such that the second image seems to be in front of or behind the first image;
combining the second stereo image and the generated border with the first stereo image; and
displaying the combined stereo images.

9. The method for displaying a stereo image as claimed in claim 8, wherein the generating a border further comprises determining a border region including contents adjacent to the border, the border region including a number of pixels in the first and second stereo images adjacent to the border.

10. The method for displaying a stereo image as claimed in claim 9, wherein the generating a border further comprises determining border depth generating the border region with depth information by determining depth of pixels in the border region based on coordinates of the respective pixels and the depth range.

11. The method for displaying a stereo image as claimed in claim 10, wherein the determining border depth determines the depth of pixels in accordance with $$\frac{d - d_{min}}{d_{max} - d_{min}} = \frac{x - x_{min}}{x_{max} - x_{min}}$$

where $X_{min}$ and $X_{max}$ are the minimum and maximum x-coordinates of the pixels, respectively, and $d_{min}$ and $d_{max}$ are the minimum and maximum depth values in the depth range, respectively.

12. The method for displaying a stereo image as claimed in claim 8, wherein generating the border increases the depth of the pixels in the border region in the second image by a depth adjustment amount derived from a maximum depth value in the border region in the first image and a minimum depth value in the border region in the second image to put the second image in front of the first image.

13. The method for displaying a stereo image as claimed in claim 8, wherein generating the border decreases the depth of the pixels in the border region in the second image by a depth adjustment amount derived from a minimum depth value in the border region in the first image and a maximum depth value in the border region in the second image to put the second image behind the first image.

14. The method for displaying a stereo image as claimed in claim 9, wherein the displaying determines which of the pixels in the border region are to be displayed either in the first stereo image or the second stereo image based on positional relationships of matching contents.

15. A non-transitory computer-readable medium comprising a computer program recorded thereon and capable of being run by a processor, including program code instructions for:
- acquiring a first stereo image for a first image and a second stereo image for a second image;
- generating a border for separating the first image from the second image with a border region having depth information by adjusting depth of pixels in the border region based on a depth range of pixels adjacent to the border, such that the second image seems to be in front of or behind the first image;
- combining the second stereo image and the generated border with the first stereo image; and
- displaying the combined stereo images.

\* \* \* \* \*